United States Patent
Dudeck

(10) Patent No.: US 9,823,164 B2
(45) Date of Patent: Nov. 21, 2017

(54) ASSEMBLY AND METHOD FOR TESTING POINT MACHINES

(71) Applicant: Siemens Aktiengesellschaft, München (DE)

(72) Inventor: Sven Gerhard Dudeck, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/123,708

(22) PCT Filed: Feb. 16, 2015

(86) PCT No.: PCT/EP2015/053201
§ 371 (c)(1),
(2) Date: Sep. 6, 2016

(87) PCT Pub. No.: WO2015/149984
PCT Pub. Date: Oct. 8, 2015

(65) Prior Publication Data
US 2017/0010182 A1    Jan. 12, 2017

(30) Foreign Application Priority Data

Apr. 3, 2014  (DE) ........................ 10 2014 206 412

(51) Int. Cl.
*G01N 3/00*    (2006.01)
*G01M 13/00*   (2006.01)
(Continued)

(52) U.S. Cl.
CPC ............... *G01M 13/00* (2013.01); *B61L 5/00* (2013.01); *B61L 5/06* (2013.01); *G01M 17/08* (2013.01)

(58) Field of Classification Search
CPC ......... G01M 13/00; G01M 17/08; B61L 5/00; B61L 5/06
(Continued)

(56) References Cited

U.S. PATENT DOCUMENTS 4,076,216 A   2/1978  Nussbaum
4,804,162 A   2/1989  Rice
(Continued)

FOREIGN PATENT DOCUMENTS

DE        10344478 A1      5/2005
DE     202008002439 U1     8/2008
(Continued)

OTHER PUBLICATIONS

PT 10K Multi: "Variabler Prüftisch für Weichenstellantriebe" Internet: http://www.probitron.de/fileadmin/pdf/datenblatt_multi .pdf; XP055094675; pp. 1-2; 2008.
(Continued)

*Primary Examiner* — Max Noori
(74) *Attorney, Agent, or Firm* — Schmeiser Olsen & Watts LLP

(57) ABSTRACT

A device under test, such as a point machine, which is screwed to two longitudinal supports, which can be individually moved horizontally and vertically is provided. Thus, a highly flexible solution is created, because even devices under test having unknown or asymmetric dimensions can be fittingly accommodated and positioned. Linear drives enable highly accurate positioning of the supports, in particular even if the supports are have high inherent weight or are already loaded with the device under test. According to one embodiment, the mechanical system is designed to grasp and/or to lift a mounting cart by means of the supports, on which mounting cart the device under test is fastened by screwing. This provides the advantage that the device under
(Continued)

test can be tested while mounted directly to the mounting cart without separate transferring and screwing of the device under test being required.

30 Claims, 11 Drawing Sheets

(51) Int. Cl.
*B61L 5/00* (2006.01)
*G01M 17/08* (2006.01)
*B61L 5/06* (2006.01)

(58) Field of Classification Search
USPC .......................................................... 73/794
See application file for complete search history.

(56) References Cited

U.S. PATENT DOCUMENTS

| | | | |
|---|---|---|---|
| 4,932,628 A | 6/1990 | Pacheco | |
| 4,993,683 A | 2/1991 | Kreuzer | |
| 2006/0273815 A1* | 12/2006 | Johnston | G01R 31/2893 324/750.19 |
| 2009/0158879 A1 | 6/2009 | Viola | |
| 2012/0046141 A1 | 2/2012 | Blankenship et al. | |
| 2015/0158511 A1* | 6/2015 | Fries | B61L 5/06 324/511 |
| 2015/0204907 A1* | 7/2015 | Ku | G01R 1/04 324/756.04 |

FOREIGN PATENT DOCUMENTS

| | | | |
|---|---|---|---|
| DE | 102012211377 A1 | 1/2014 | |
| GB | 630472 A | 10/1949 | |

OTHER PUBLICATIONS

"Weichenstellsysteme"; Richtungsweisende Technik von Hanning &KAHL; URL: http://www.hanning-kahl.de/fileadmin/huk/Inhalte/Abbildungen/Produkte_Service/Bahntechnik/Weichenstellsystem/Weichenstellsysteme_01.pdf; pp. 1-16; XP055094669; 2010.

"WAMS—Komponenten"; hastema Bahntechnik Schulung; URL: http://www.transmetra.ch/images/storiess/pdf/sensorik/kraftsensoren/dokumente/a06.applikation_weichenantrieb.pdf; pp. 1-13; XP055094672; 2006.

International Search Report PCT/EP2015/053201; dated Feb. 18, 2015; 3 pgs.

* cited by examiner

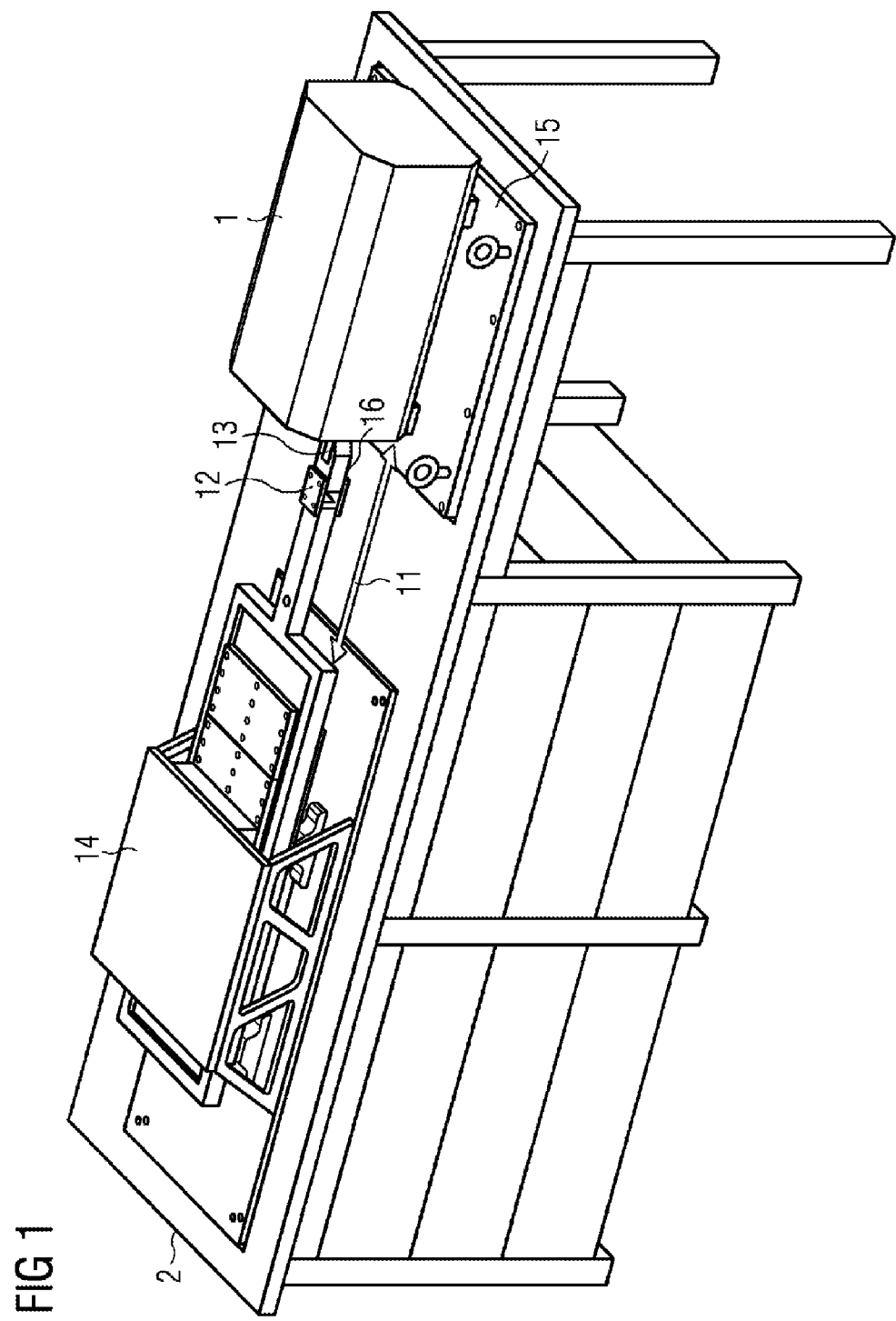

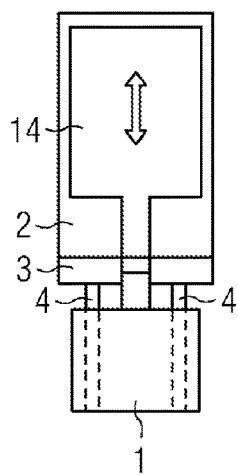
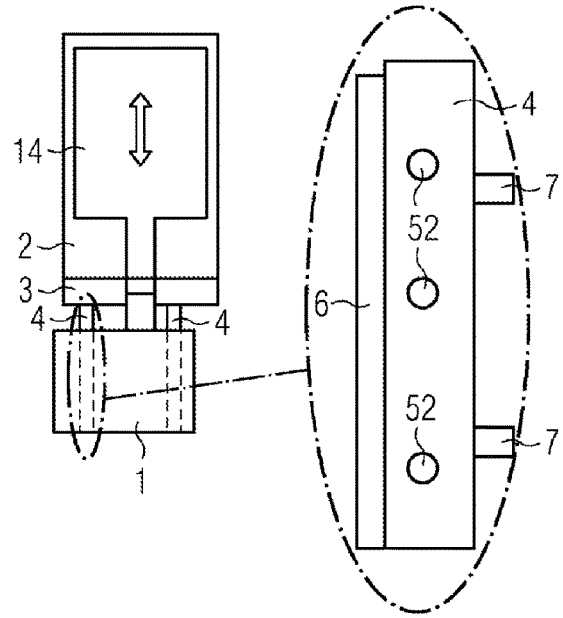
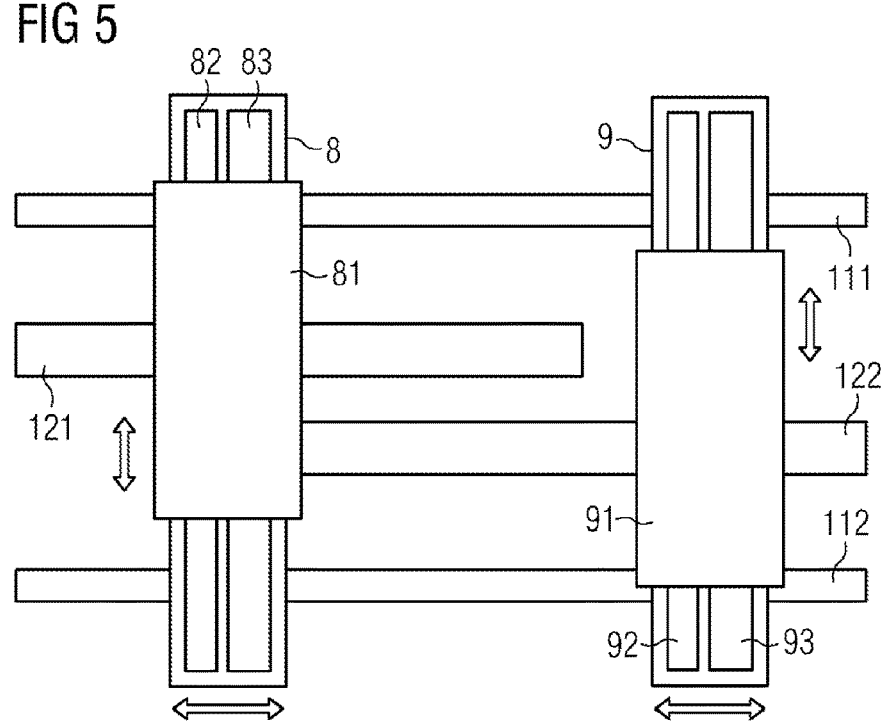

ASSEMBLY AND METHOD FOR TESTING POINT MACHINES

CROSS-REFERENCE TO RELATED APPLICATIONS

This application claims priority to PCT Application No. PCT/EP2015/053201, having a filing date of Feb. 16, 2015, based off of DE Application No. 10 2014 206 412.0 having a filing date of Apr. 3, 2014, the entire contents of which are hereby incorporated by reference.

FIELD OF TECHNOLOGY

The following point machines serve for switching the travel path of a rail vehicle on the rails. Said point machine is typically composed of an electric motor, the rotary motion of which is converted by way of a spindle rod or a gear rod to a linear motion. In most instances, a coupling which prevents excessive force being introduced to the rails is also part of the mechanical system.

BACKGROUND

In the course of the production or refurbishment of point machines the forces which are produced by the point machine finally have to be adjusted and tested. It is, inter alia, an objective that the forces which are generated by the point machine do not exceed or undershoot specific upper and lower limits, respectively. For this purpose, counter-forces which correspond to the forces of the switch blade during later operation are applied to the point machine as a specimen while said point machine performs actuation procedures on the test bed. Furthermore, the test bed may also actively apply tensile forces to the specimen while the latter does not perform any actuation procedures. To this end, the point machine is placed on the test bed, is fastened thereto, connected to the testing system, tested, dismounted, and finally removed again.

The mechanical dimensions of the point machines vary very much, depending on the field of application, the manufacturer, and the development history. In external terms, the common feature of all point machines is the so-called throw bar, which transmits the linear motion and force of the drive to the switch blade, and (optionally) the so-called check bars, which likewise are connected to the switch blade and enable mechanical feedback of the blade position to the drive. For testing, the point machine is ideally fastened in the same manner as the former is later fastened to the tracks (in most instances by way of a plurality of screw connections). By virtue of the dissimilar external dimensions of the drives, the two movable components in relation to the fastening points of the point machine are located at dissimilar positions.

A variable test bench for point machines, which is composed of a basic module and replaceable testing modules, is known from the document "PT 10K Multi: variable test bench for point machines", obtainable on the internet on Mar. 31, 2014 at http://www.probitron.de/fileadmin/pdf/datenblatt_multi.pdf. The basic module disposes of a hydraulic plant as a force generator, a controller, and measuring and safety technology. Individual testing modules which as per the depiction are each composed of one bench with rollers, and of position holders which are individually tailored to the point machine are available for various models of point machines. Adapting the coupling point between the specimen and the test-bed force generator is thus performed by mounting the specimen on a testing module which is individually tailored to the specimen.

SUMMARY

An aspect relates to an assembly and a method which provide an alternative to the state of the art for testing point machines.

According to the following, this aspect is achieved by an assembly having at least one receptacle device. The receptacle device comprises at least two supports which are adapted for receiving a point machine as a specimen, or for receiving a mounting truck on which a point machine is mounted as a specimen, and a mechanism which is adapted for displacing the supports both in the horizontal direction and in the vertical direction. The assembly furthermore includes a test bed which disposes of a force generator which is adapted for applying counterforces to the specimen while the specimen on the test bed performs actuation procedures, on account of which the test bed is adapted for adjusting and/or testing forces which are generated by the specimen. The force generator and the mechanism in mechanical and electrical terms are mutually independent such that the supports are displaceable without being influenced by the test bed or by the force generator, on account of which a predefined coupled position between the specimen and the force generator is adjustable.

In the case of the method for testing a point machine, at least two supports are displaced in both the horizontal direction and in the vertical direction by one mechanism. A point machine as a specimen is mounted on the supports. Alternatively, a mounting truck (20), to which a point machine as a specimen is fastened, is gripped and/or lifted by the mechanism by way of the supports. A test bed, by way of a force generator, applies counterforces to the specimen while the specimen on the test bed performs actuation procedures, wherein forces which are generated by the specimen are adjusted and/or tested. The supports prior to mounting of the specimen are displaced without being influenced by the test bed or by the force generator, on account of which a predefined coupled position between the specimen and the force generator is adjusted.

The advantages which are mentioned hereunder need not necessarily be achieved by the disclosed subject matter. Rather, this herein may also be advantages which are achieved merely by individual embodiments, variants, or refinements.

The receptacle device enables a multiplicity of specimens to be received, independently of the geometric dimensions of said specimens. To this end, said receptacle device provides a flexible adapter mechanism which, optionally in an automated manner, can be moved to required positions. A highly flexible solution is thus achieved.

The assembly and the method enable an automated solution to fixing and coupling of the force transmission for the point machine. An advantageous effect is that the position of the force generator and of the sensitive measuring sensor assembly does not have to be moved in order for the applied forces to be fed back. Furthermore, it is guaranteed at all times that the introduction of force during measurement is performed in the motion direction.

According to one embodiment, the mechanism is adapted for adjusting a horizontal spacing between the supports.

This has the advantage that specimens having dissimilar widths may also be received and positioned with a good fit.

In one refinement, the mechanism is adapted for displacing the supports in a mutually independent manner, both in the horizontal direction and in the vertical direction.

This has the advantage that specimens having asymmetric dimensions may also be received and positioned with a good fit.

According to one embodiment, the mechanism for displacing the supports in the horizontal direction and in the vertical direction has horizontal and vertical linear guides, in particular linear friction bearings, dovetail guides, profiled rail guides, or caged rail guides.

Displacing of the supports herein, in particular in the horizontal direction, may be performed by manual displacement. The support in the target position is subsequently fixed by clamping. Alternatively or additionally, linear drives may be employed.

In one refinement, the mechanism for each of the supports is specified with one dedicated horizontal linear drive and with one dedicated vertical linear drive, said linear drives both being adapted for automated displacement of the respective support to a required position.

The linear drives enable highly accurate positioning of the supports in particular even when the latter have a high dead weight or are already loaded with the specimen. Furthermore, positioning of the supports may be automated by means of the linear drives.

According to one embodiment, the mechanism is configured from at least two vertically mounted cross tables and/or vertically mounted X-Y linear drives, one of the supports being mounted on each thereof.

Alternatively, both supports may be mounted on a single vertically mounted cross table or X-Y linear drive, on account of which the adjustment possibilities are limited, however.

In one refinement, each support is mounted on a support slide which is displaceable by the respective linear drive. Each vertical linear drive is mounted on a transverse slide which is displaceable by the respective horizontal linear drive.

According to one embodiment, the linear drives interact with in each case parallel guides which are constructed for guiding the respective slides. The linear drives each include one hydraulic or electric linear motor or linear actuator. In one refinement, the assembly includes a controller in which support positions depending on types of specimens are programmed, whereby the controller is adapted for actuating the linear drives and for automated displacing of the supports to the support positions.

According to one embodiment, the mechanism by way of the supports is conceived for gripping and/or lifting a mounting truck, the specimen being fastenable thereto by a screw connection. To this end, the supports have fastening elements, in particular bolts, pins, gripping arms, depressions, or horizontal bores, which are disposed inboard and which permit the mounting truck to be gripped in particular by clamping the mounting truck between the supports.

This offers the advantage that the specimen may be tested when mounted directly on the mounting truck, without separate repositioning and screwing down of the specimen being required.

In one refinement, the supports have vertical threaded bores which permit fastening of the specimen by a screw connection.

This offers the advantage that the specimen may be fastened in a like manner to being fastened to the rails.

According to one embodiment, the supports have outboard fastening means, in particular dovetail profiles, which are screwed into horizontal threaded bores and which are adapted for fastening additional fastening elements, in particular clamps, for the specimen.

This offers the advantage that specimens having previously unknown or unfavorable dimensions may also be securely fixed to the supports.

In one refinement, the receptacle device is mounted on the test bed per se, or on the floor beside the test bed.

According to one embodiment, the test bed has a test-bed interface which has at least one horizontal guide. The assembly furthermore has a slide which is displaceable along the horizontal guide. Furthermore, the assembly comprises at least two of the receptacle devices which are mounted beside one another on the slide.

This embodiment offers the advantage that with the aid of the slide a second receptacle device and thus a second mounting position are provided. This means that during the testing procedure of a first point machine which is mounted in a testing position on the slide, a further point machine may already be mounted in a laterally offset manner on the other receptacle device, said further point machine being later moved to the testing position by lateral displacement of the horizontal slide.

In one refinement, the assembly includes a running gear, in particular composed of rollers, wheels, or a guide, which supports the slide on a ground.

According to one embodiment, the assembly includes at least one protective wall which is mounted between the receptacle devices on the slide. Alternatively, the assembly includes a protective hood which is mounted on the test bed.

In one refinement, the assembly includes an adapter truck which has a frame on which the receptacle device is mounted. The frame has a truck interface by way of which the adapter truck is capable of being mechanically coupled to a test-bed interface of the test bed.

The adapter truck may be connected to the test bed in a rapid and uncomplicated manner. In this way, it is also possible for adapting and testing to be completely separated from one another in spatial terms. A point machine which has once been adapted to the adapter truck may pass through various further testing installations (for example, electrical tests or running-in drives), without manual adapting having to be re-performed.

Flexible adapting by means of the movable adapter truck enables the specimen to be loaded outside the test bed. This is advantageous, for example, if and when the test bed is not located in a region which is serviced by a crane. The adapter truck may be optionally docked beside a plurality of adapter stations and also to other testing stations such as for electrical tests or running-in procedures for the point-machine coupling.

The adapter truck thus permits point machines to be dispatched by way of one or a plurality of test beds in a more rapid and, above all, an arbitrary sequence, without there being any additional tooling effort. The simple switching of stations has the additional advantage that the entire test procedure may be broken down such that expensive equipment is only required for individual test stations which are utilized in an optimal manner, and does not remain unutilized during other tests. Testing tasks which are simple yet time intensive may be outsourced to separate and simple test stations.

According to one embodiment, the assembly includes an adapter station which is adapted for mechanically coupling the truck interface of the adapter truck to the adapter station, and by means of the mechanism for displacing the supports both in the horizontal direction and in the vertical direction.

In one refinement, the mechanism for each of the supports has a drive shaft for a self-locking actuator gear for displacing the respective support in a direction X. Furthermore, the mechanism for each of the supports has a drive shaft for a self-locking actuator gear for displacing the respective support in a direction Y which is orthogonal to the direction X.

According to one embodiment, the drive shafts each have a mechanical connector for transmitting torque, by way of which the drive shafts, when mechanically coupling the adapter truck to an adapter station, are capable of being automatically docked to actuators in the adapter station.

In one refinement, the truck interface includes an electric plug connector which when mechanically coupling the adapter truck to the test bed or to the adapter station is automatically plugged into an electrical plug connector of the test-bed interface or of the adapter station.

According to one embodiment, the adapter truck includes an actuator for each of the drive shafts. The adapter station by way of the electrical plug connectors provides electric power and control signals to the actuators, in order for the supports to be displaced.

In one refinement, the assembly additionally comprises a mounting truck which is adapted for receiving the point machine and which is capable of being fixed by a form-fit between the supports.

This refinement permits simple standard mounting trucks to be received directly between the supports for testing. To this end, the point machine is first mounted on the standard mounting truck. For subsequent testing, the mounting truck is tension-fitted to the adapter truck which may automatically dock to the various test stations and is capable of absorbing the testing forces. In the case of there being assembly lines which operate without mounting trucks, the specimen may also be screwed directly to the arms of the adapter truck.

In one refinement of the method, the supports in a mutually independent manner are displaced both in the horizontal direction and in the vertical direction.

According to one embodiment of the method, a controller, in which support positions depending on types of specimens are programmed actuates linear drives, and in an automated manner displaces the supports to one of the support positions.

In one refinement of the method, an adapter truck having a truck interface is docked to an adapter station. Herein, a plug connector of the truck interface is automatically plugged into a plug connector of the adapter station, on account of which actuators of the adapter truck are supplied with electricity. Alternatively, for transmitting torque, actuators of the adapter station are docked to mechanical connectors of the truck interface. The adapter truck is adapted to a specimen or a mounting truck in that the supports of the adapter truck, by means of the actuators of the adapter truck, or the actuators of the adapter station, are displaced to positions which are suitable for receiving the specimen or the mounting truck. The specimen now is mounted on the adapter truck. Alternatively, the mounting truck is clamped in a form-fitting manner between the supports. Finally, the adapter truck by way of the truck interface thereof is docked to a test bed.

According to one embodiment, the assembly is used for adjusting the predefined coupled position between the specimen and the force generator on the test bed.

In one refinement, the receptacle device of the assembly is used for gripping and/or lifting a mounting truck on which the specimen is mounted.

According to one embodiment, the assembly is used for adjusting and/or testing forces which are generated by a point machine as a specimen.

BRIEF DESCRIPTION

Some of the embodiments will be described in detail, with reference to the following figures, wherein like designations denote like members, wherein:

FIG. 1 shows a test bed for checking a point machine, to which the specimen is fixedly screwed;

FIG. 4A shows a plan view of the test bed and of the device of FIGS. 2A and 3A;

FIG. 4B shows a plan view of the test bed shown in FIGS. 2B and 3B, with a lowered device which is laterally displaced for receiving a specimen, whereby the left longitudinal support is again shown in detail;

FIG. 5 shows a front view of a mechanism which is suitable for displacing the supports in a mutually independent manner, both in the horizontal direction and in the vertical direction;

Unless otherwise stated, identical elements, or elements with equivalent functions, are provided with identical reference signs in the figures.

DETAILED DESCRIPTION

Figure 2A:
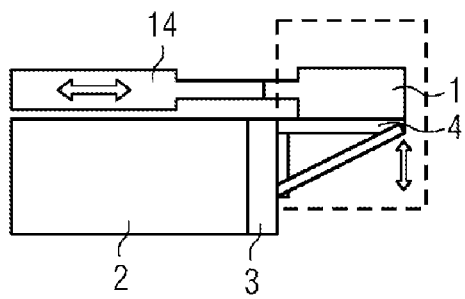
FIG. 2A shows a side view of a test bed having a device for receiving a specimen, in a first vertical adjustment.

FIG. 1 shows a specimen 1, presently a point machine, which is fastened to an adapter plate 15 which is screwed to a test bed 2. A throw bar 13 is driven by the specimen 1 in a force and motion direction 11. The throw bar 13 by way of a coupling point 16 is coupled to a force generator 14, on account of which a force measurement 12 is enabled. The force generator 14 on the test bed is a hydraulic or electric linear drive, for example.

FIG. 2A shows a side view of a device for receiving a specimen, which is mounted on a test bed 2. A force generator 14 which for adjusting and checking forces which are generated by a specimen 1 interacts with the specimen 1 is also located here on the test bed 2. Furthermore, the force generator 14 may also actively apply tensile forces to the specimen 1 while the latter does not perform any actuation procedures. The specimen 1 is screwed to longitudinal supports 4 which in turn are suspended on a mechanism 3 which is laterally fastened to the test bed 2. FIG. 2A shows the longitudinal supports 4 in an upper position.

Figure 2B:
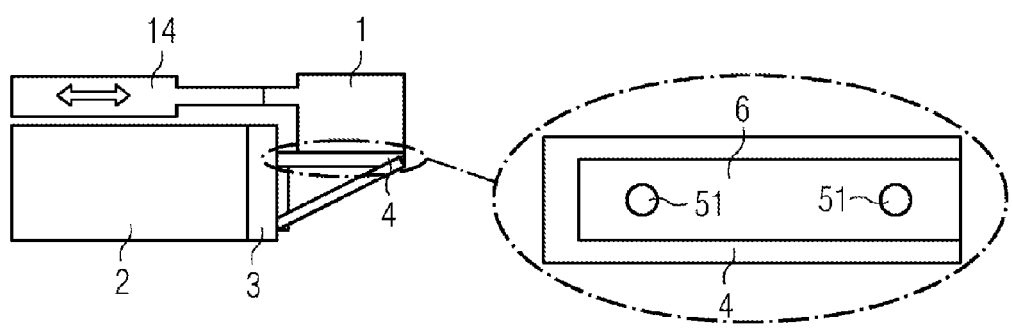
FIG. 2B shows a side view of the test bed of FIG. 2A, whereby the device has been vertically lowered for receiving the specimen, with a detailed view of a longitudinal support of the device.

FIG. 2B shows a further side view of the exemplary embodiment of FIG. 2A, in which the longitudinal supports 4 have been vertically lowered. FIG. 2B (as also FIGS. 3B and 4B) also includes a detailed view of the front or left longitudinal support 4, respectively. A dovetail profile 6 which is screwed into horizontal threaded bores 51 in the longitudinal support 4 is visible in the side view of the longitudinal support 4 in FIG. 2B.

Figure 3A:
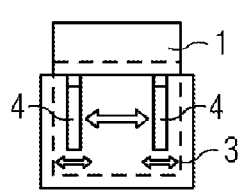
FIG. 3A shows a front view of the device shown in FIG. 2A.

FIG. 3A shows a front view of the exemplary embodiment of FIG. 2A, whereby the longitudinal supports 4 are positioned at the upper stop, as in FIG. 2A. The arrows in FIG. 3A indicate that the longitudinal supports 4 are horizontally displaceable in both directions. The spacing between the longitudinal supports 4 is also adjustable.

Figure 3B:
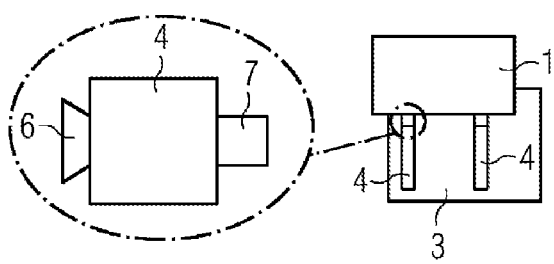
FIG. 3B shows a front view of the lowered device shown in FIG. 2B, with a detailed view of a longitudinal support.

FIG. 3B shows a front view of the exemplary embodiment having longitudinal supports 4 which are lowered in a manner corresponding to FIG. 2B. Lowering the longitudinal supports 4 makes it possible for a specimen 1 which has a larger installation height than the specimen 1 of FIG. 2A or FIG. 3A, respectively, to be mounted. Lowering the longitudinal supports 4 guarantees that the coupling point 16 which is explained in the context of FIG. 1 can be kept stationary. This has the advantage that the position of the force generator 14 and the sensitive measuring sensor assembly for the force measurement 12 shown in FIG. 1 does not have to be moved. It is furthermore guaranteed that the introduction of force by the force generator 14 and of the specimen 1 is at all times performed in the force and motion direction 11 which is shown in FIG. 1. Since the force generator 14 and the mechanism 3 in mechanical and electrical terms are mutually independent, the longitudinal supports 4 may be displaced to the respective required position without influencing the sensitive measuring sensor assembly and the force generator 14.

Figure 7A:
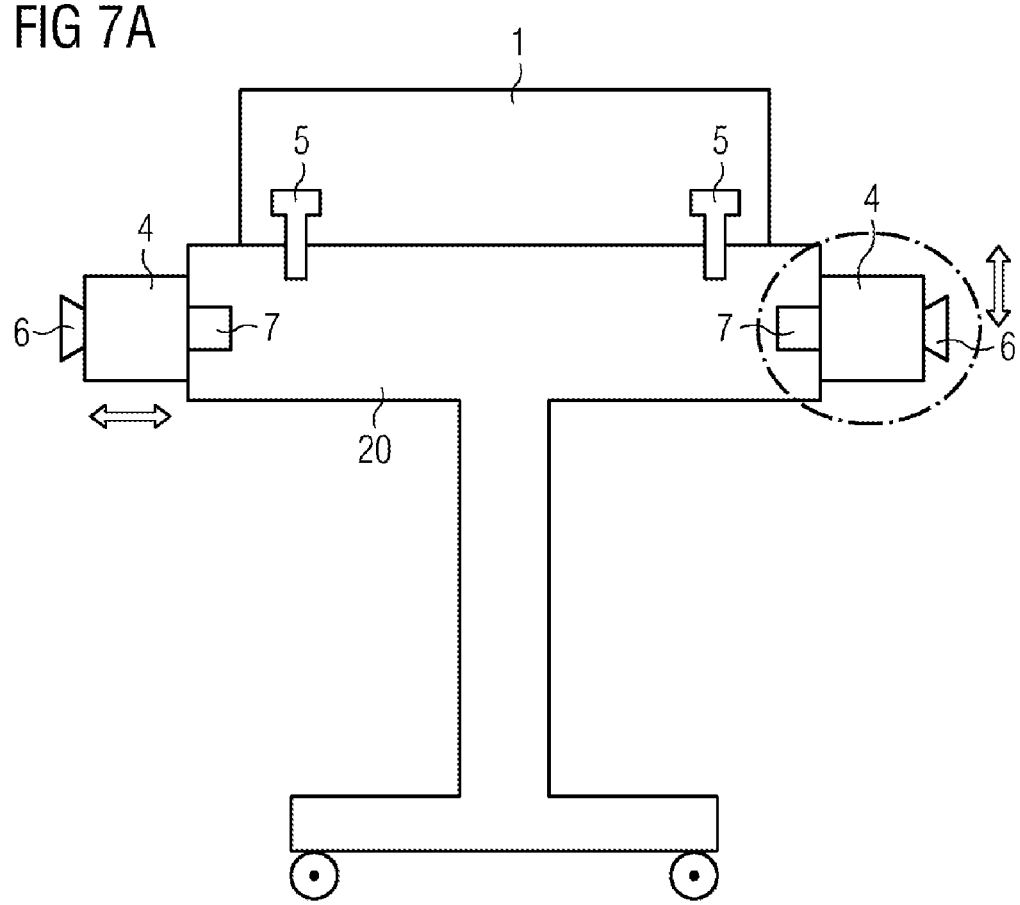
FIG. 7A shows a front view of a mounting truck to which a specimen is screwed, whereby the mounting truck is jammed between the longitudinal supports of the device shown in FIGS. 2A to 6.
Figure 8A:
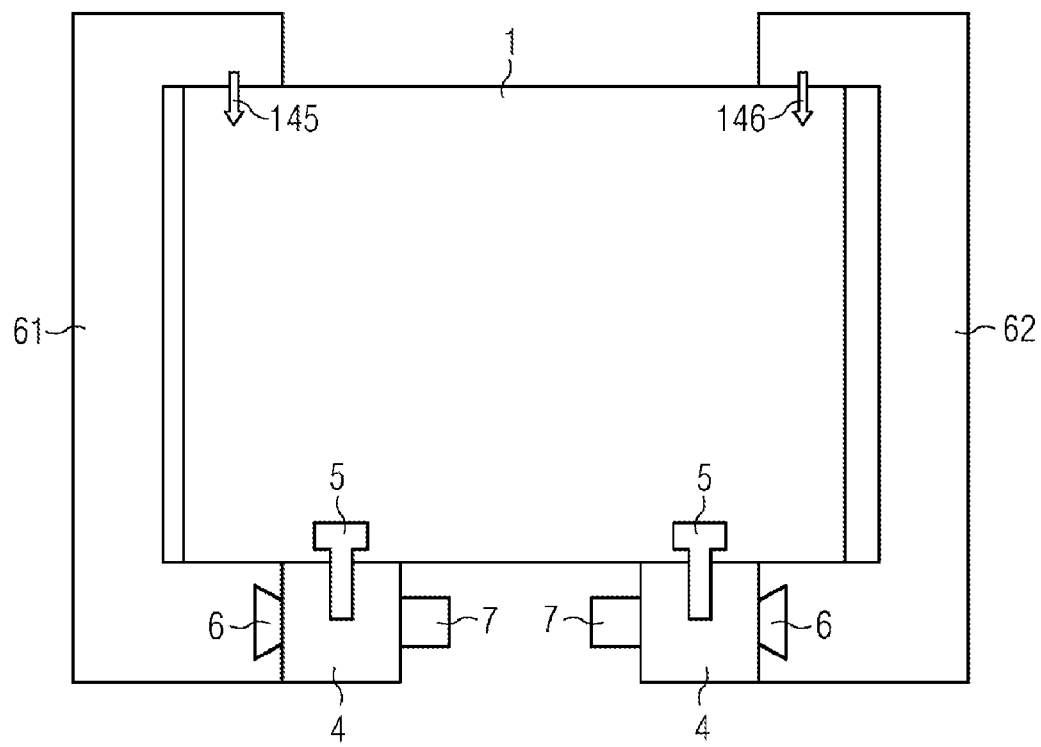
FIG. 8A shows additional clamps which by way of dovetail connections are mounted on the longitudinal supports and which apply additional clamping forces to the specimen, in a front view.
Figure 8B:
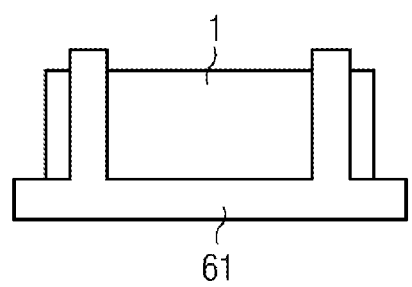
FIG. 8B shows one of the two clamps of FIG. 8A, in a side view.

FIG. 3B additionally and in an analogous manner to FIG. 2B shows the left longitudinal support 4 in a detailed view, whereby the dovetail profile 6 can be seen again. The latter serves for further fastening elements to be pushed thereonto, in particular the clamps 61, 62 which are shown in FIGS. 8A and 8B, by way of which specimens 1 having particular dimensions may be additionally fastened. FIG. 3B in the detailed view on the internal side of the longitudinal support 4 shows bolts 7 which serve for adapting a mounting truck 20, as is shown in FIG. 7A.

Figure 3C:
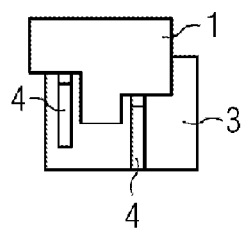
FIG. 3C shows a front view of a device for receiving a specimen, in which the two longitudinal supports have been displaced to dissimilar vertical positions, so as to receive an asymmetric specimen 1.

FIG. 3C shows a front view of a variant of the device of FIGS. 2A to 3B, in which the two longitudinal supports have been displaced to dissimilar vertical positions, so as to receive an asymmetric specimen 1.

FIG. 4A shows a plan view of the device, which corresponds to the front view in FIG. 3A and to the side view in FIG. 2A.

Correspondingly, FIG. 4B shows a plan view which corresponds to the side view of FIG. 2B and to the front view of FIG. 3B. It can be seen herein that the longitudinal supports 4 have been displaced to the left, so as to receive a horizontally asymmetric specimen 1. The left longitudinal support 4 is shown so as to be enlarged in a detailed view also in the plan view in FIG. 4B. Vertical threaded bores 52 into which the specimen 1 may be screwed are visible in the plan view beside the dovetail profile 6, which has already been explained, and the bolts 7. The provision of a sufficient number of suitably positioned vertical threaded bores 52 ensures that the specimens 1 may be positioned in a sufficiently flexible manner also in the third dimension which cannot be adjusted by the mechanism 3.

FIG. 5 shows the mechanism 3 of FIGS. 2A to 4B in detail, in a front view. A left transverse slide 8 and a right transverse slide 9 are mounted so as to be horizontally displaceable on an upper transverse-slide guide 111 and on a lower transverse-slide guide 112. The left transverse slide 8 by means of an upper linear axis 121 is traversed along the horizontal guides 111, 112. Accordingly, the right transverse slide 9 by means of a lower linear axis 122 is displaced along the guides 111, 112. In a manner corresponding to FIG. 5, the left transverse slide 8 and the right transverse slide 9 are horizontally displaceable in a mutually independent manner.

A left mounting slide 81 which is guided on a left mounting-slide guide 82 and is driven by a left linear axis 83 is mounted on the left transverse slide 8. The left longitudinal support 4 which is shown in detail in FIGS. 2B, 3B, and 4B, is mounted on the left mounting slide 81.

Accordingly, a right mounting slide 91 which in turn is guided on a right mounting-slide guide 92 and is driven by a right linear axis 93 is mounted on the right transverse slide 9. The right longitudinal support 4 which has been shown in FIGS. 3A, 3B, 3C, 4A, and 4B, is mounted on the right mounting slide 91.

The linear axes are electric or hydraulic linear drives, linear motors, or linear actuators. Suitable robust linear drives and support constructions are known from fork-lift trucks, for instance, the steel prongs of the latter being readjustable in the horizontal spacing thereof and being vertically displaceable by means of a hydraulic drive.

In one alternative design embodiment, the horizontal linear drives and optionally also the vertical linear drives are replaced by manual adjustment devices. In one further alternative design embodiment, only one linear drive is in each case provided for the horizontal and/or vertical displacement of both supports, such that the longitudinal supports 4 may only be displaced in a synchronous manner in the horizontal and/or vertical direction.

Figure 6:
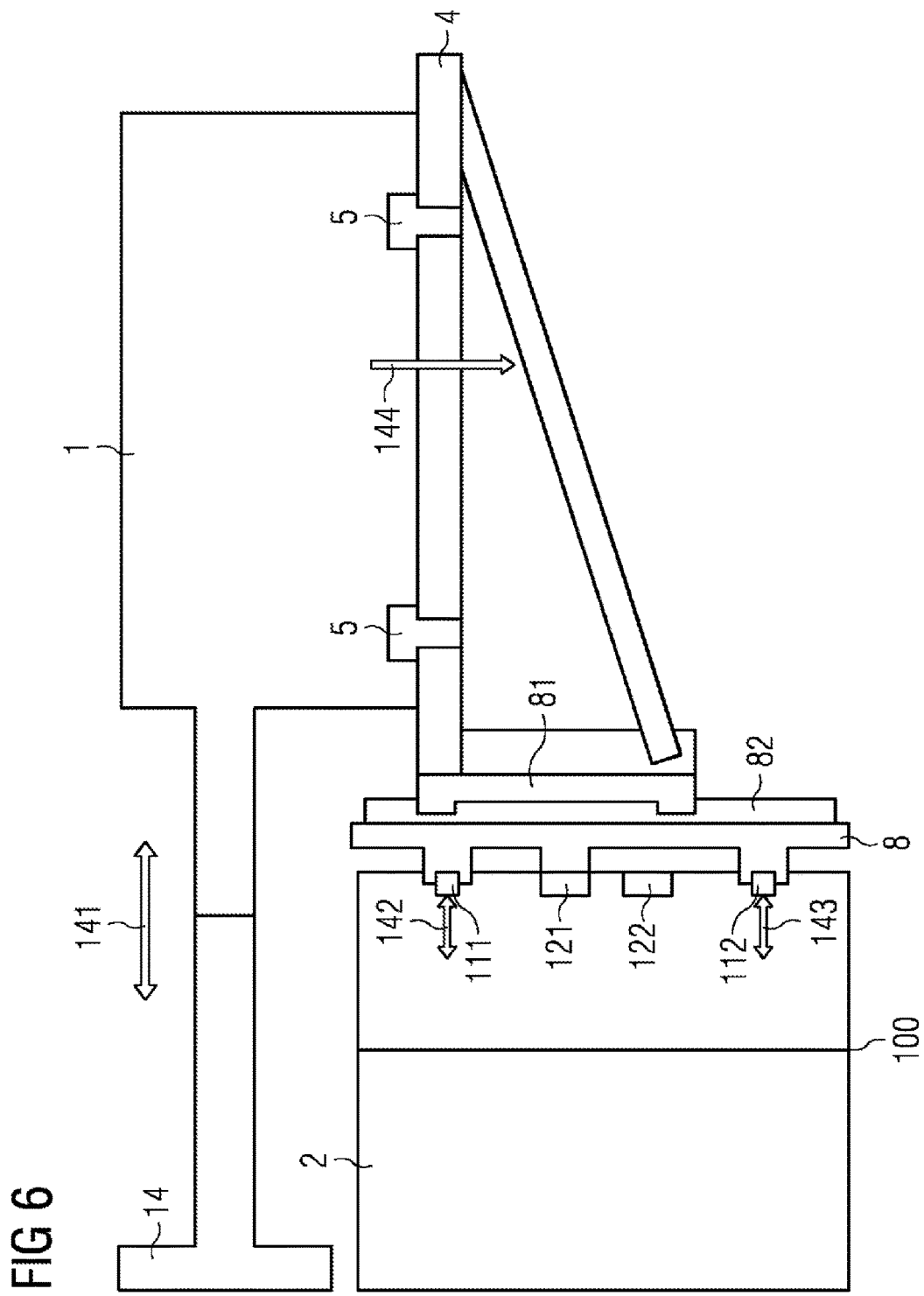
FIG. 6 shows a detailed side view of the mechanism of FIG. 5, which additionally shows a longitudinal support, a specimen, a force generation, and a test bed.

FIG. 6 shows a side view of the device, corresponding to the front view of FIG. 5, which has been sectioned at the level of the mechanism 3. The left transverse slide 8 which is guided on the upper transverse-slide guide 11 and on the lower transverse-slide guide 112 and which is driven by means of the upper linear axis 121 is visible in the side view of FIG. 6. The left mounting slide 81 on which the left longitudinal support 4 is mounted, is mounted on the left transverse slide 8. In a manner corresponding to FIG. 6, testing forces 141 act between the force generator 14 and the specimen 1, since the specimen as a point machine, in interaction with the force generator 14, performs simulated point actuation procedures. Additionally, a weight 144 of the specimen acts on the longitudinal support 4. The upper transverse-slide guide 111 as a first force 142 has to absorb a force which results from both the reaction to the testing forces 141 and to the weight 144 of the specimen 1. The same applies to the lower transverse-slide guide 112 on which a second force 143 consequently acts. An interface 100 between the entire mechanism and the test bed 2 has to be embodied in a sufficiently robust manner beside the suspension of the transverse-slide guides 111, 112, so as to be able to withstand the weight 144 of the specimen 1 plus the reaction to the testing forces 141.

Alternatively to FIG. 6, the interface 100 may also be implemented above the floor in that the mechanism for displacing the longitudinal supports is screwed directly to the floor. The test bed 2 and the mechanism are separately fastened in this variant.

FIG. 6 shows the longitudinal supports 4 in a slightly lowered position. This again guarantees that the coupling point and consequently also the force generator 14 can be kept at a constant defined height on the test bed 2.

FIG. 7a shows a further front view of the device. A mounting truck 20 by suitable horizontal displacement, presently contraction, of the longitudinal supports 4 is clamped in a form-fitting manner and secured by means of the bolts 7. Herein, additionally to the arrows shown in FIG. 7A, and as has already been explained above, each of the longitudinal supports 4 is displaceable both in the horizontal direction and in the vertical direction. This results in that the clamped mounting truck 20 may be lifted in its entirety by means of the longitudinal supports 4. It is also possible for the mounting truck 20 to be initially lifted, for the running frame to be removed, and for the mounting truck 20 to be subsequently displaced in a position which is lower than would be permissible by the running gear.

The specimen 1 is fixedly screwed to the mounting truck 20 by way of screws 5. In order to be employed on the test bed, it is necessary for the receptacle plate of the mounting truck 20 to be sufficiently strong in order to be able to absorb the testing forces explained above and to transfer the latter by way of the longitudinal supports 4 to the mechanism. By contrast, the base of the mounting truck 20, or the running gear, respectively, does not have to absorb any testing forces since the mounting truck 20 is clamped at the level of the receptacle plate thereof.

Figure 7B:
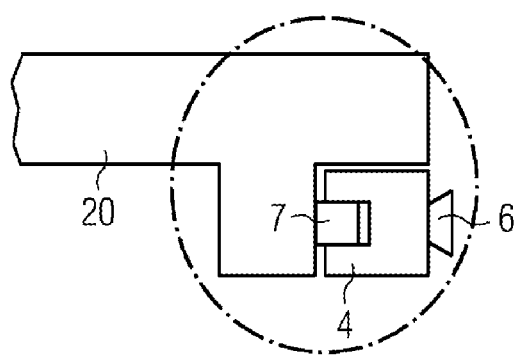
FIG. 7B shows a detailed view of the front view of FIG. 7A, illustrating an alternative design embodiment of the clamping connection between longitudinal supports and mounting trucks.

FIG. 7B shows a detail of FIG. 7A in a deviating embodiment. In a manner corresponding to FIG. 7B, the bolt 7 is not attached to the longitudinal support 4 but to the mounting truck 20. The longitudinal support 4 in this case has a matching bore, or a recess, respectively, for the bolt 7. In a manner corresponding to FIG. 7B, mounting the bolt to the longitudinal support 4 is dispensed with should the latter be obstructive in the instance of the specimen 1 being mounted directly on the longitudinal support 4.

FIG. 8A shows a left clamp 61 which is plug-fitted on the dovetail profile 6 of the left longitudinal support 4 and which applies a first clamping force 145 to the specimen 1 which here by means of screws 5 is screwed to the longitudinal supports 4. In a corresponding manner, a right clamp 62 is plug-fitted on the dovetail profile 6 of the right longitudinal support 4 and applies a second clamping force 146 to the specimen 1.

In a manner analogous thereto, FIG. 8B shows a side view of the left clamp 61 and of the specimen 1. Specimens 1 which by way of the screws 5 can only be insufficiently fastened or not fastened at all may be fixedly braced on the longitudinal supports 4 by means of the clamps 61, 62. This offers the advantage that specimens 1 having unusual dimensions may also be adapted.

Figure 9:
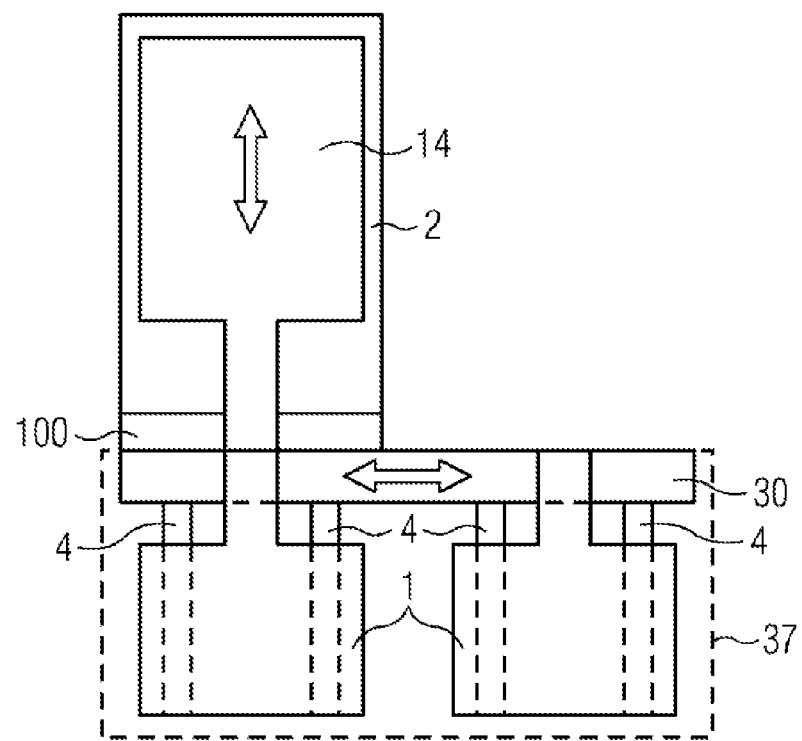
FIG. 9 shows a plan view of a test bed on which, by means of a horizontal guide, a slide having two mounting spaces for point machines as specimens is displaceable in the horizontal direction.

FIG. 9 shows a plan view of a test bed 2 having a double receptacle which is composed of a slide 30 which is mounted on a test-bed interface 100. Two receptacles for a point machine, each of the former being composed of two individually adjustable longitudinal supports 4, are mounted on the slide 30. A point machine as a specimen 1 is mounted on each of the receptacles. The moving region 37 may be laterally displaced along the test-bed interface 100, on account of which the right specimen 1 may be displaced to a testing position in front of a force generator 14 of the test bed 2. In the position shown in FIG. 9, the left specimen 1 is being tested while the right specimen 1 may be replaced. Adapting to the next point machine may be performed here on the right side by means of the adjustable longitudinal supports 4.

The flexible receptacle of the preceding exemplary embodiments is thus provided twice, whereby both receptacles are mounted on the common slide 30 which is horizontally traversable. On account thereof, the next specimen 1 may already be adapted while the current specimen 1 is still positioned in the testing position, still aligned with the stationary force generation 14.

By attaching the second receptacle so as to be parallel with the first receptacle on the common slide 30 which is horizontally movable, the two receptacles may be rapidly replaced in front of the force generation 14. The specimen may be changed on that receptacle that in each case is not located in front of the force generation 14, without impeding testing of the other specimen. The adapting position is located in an alternating manner to the left and to the right of the testing position. Changing of positions may be performed manually or automatically.

Figure 10:
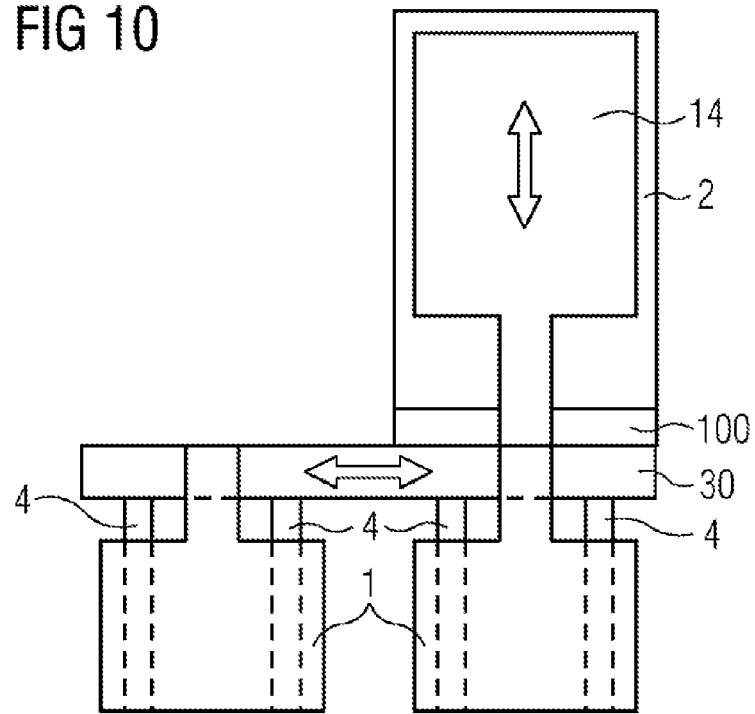
FIG. 10 shows the test bed of FIG. 9, in which the slide having the mounting spaces has been displaced to the left.

FIG. 10 shows the double receptacle of FIG. 9, once the specimen 1, which has been replaced on the right side of the movable region, has been conjointly displaced with the slide 30 in front of the force generator 14 on the test bed 2. The testing position henceforth is consequently on the right side, while a new specimen 1 may be mounted in the adapting position on the left side.

Figure 11:
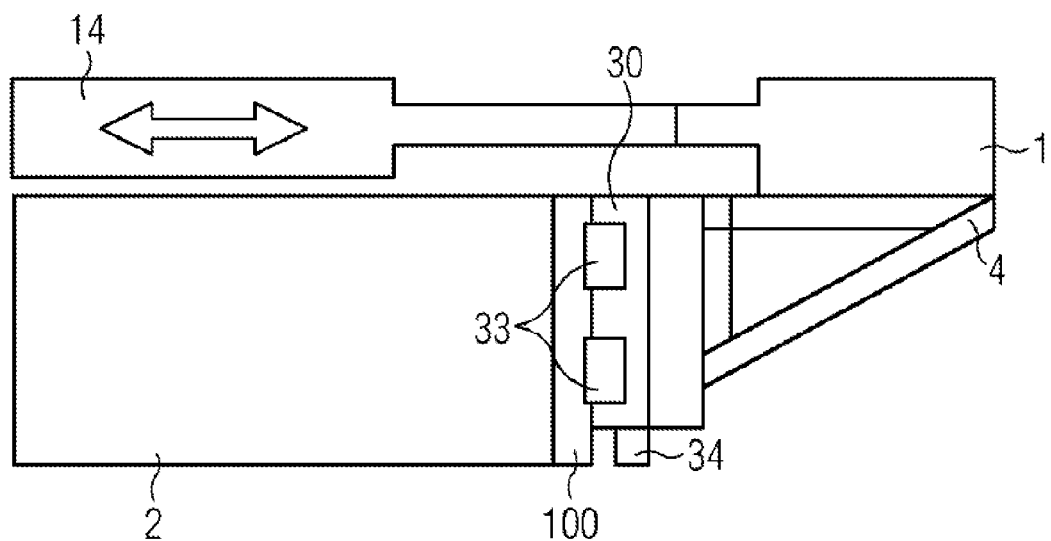
FIG. 11 shows a side view of the test bed of FIGS. 9 and 10, showing a section through the slide and through the horizontal guide.

FIG. 11 shows a side view of the double receptacle. The slide 30 by means of one or a plurality of horizontal guides 33 is connected to the test-bed interface 100. The horizontal guides 33 must be able to transmit the testing forces which have already been explained in the context of FIG. 6. The slide 30 by means of a running gear 34 is supported on the ground. The slide 30 herein is mounted on rollers, wheels, or on a rail, for example, the former potentially serving as an additional guide for the horizontal motion.

Figure 12:
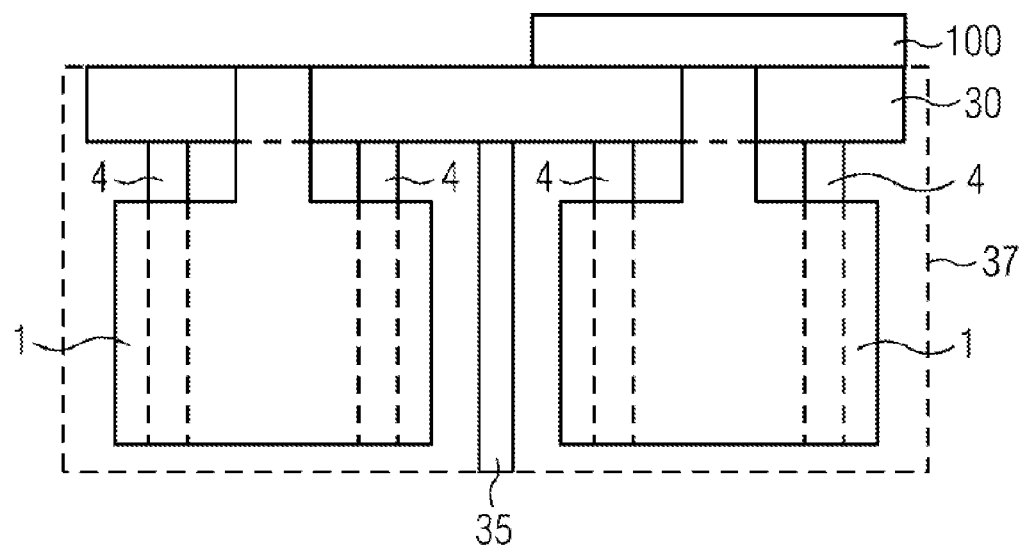
FIG. 12 shows a detailed view of the test bed of FIGS. 9 to 11, having a protective wall which is mounted on the slide and is conjointly moved.

FIG. 12 shows an exemplary embodiment of the double receptacle of FIGS. 9 to 11, in which the two receptacles are separated by a protective wall 35 as an occupational protection for a technician.

Figure 13:
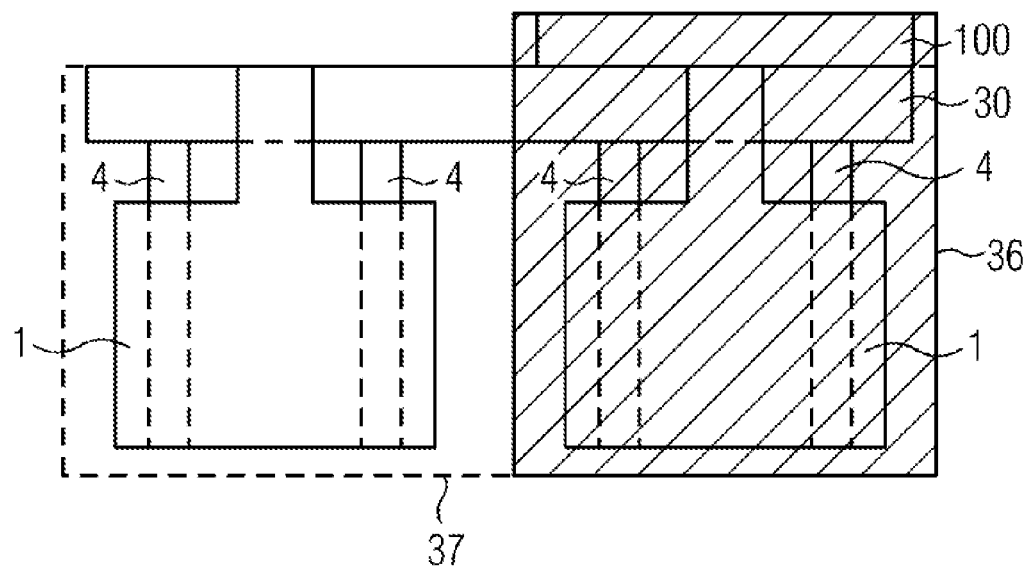
FIG. 13 shows a detailed view of the test bed of FIGS. 9 to 11, having a protective hood which has been lowered over a test space.

FIG. 13 shows an alternative exemplary embodiment in which a protective hood 36 is lowered over the testing position.

Both exemplary embodiments serve for excluding any mechanical risk for a technician at the adapting position.

Figure 14:
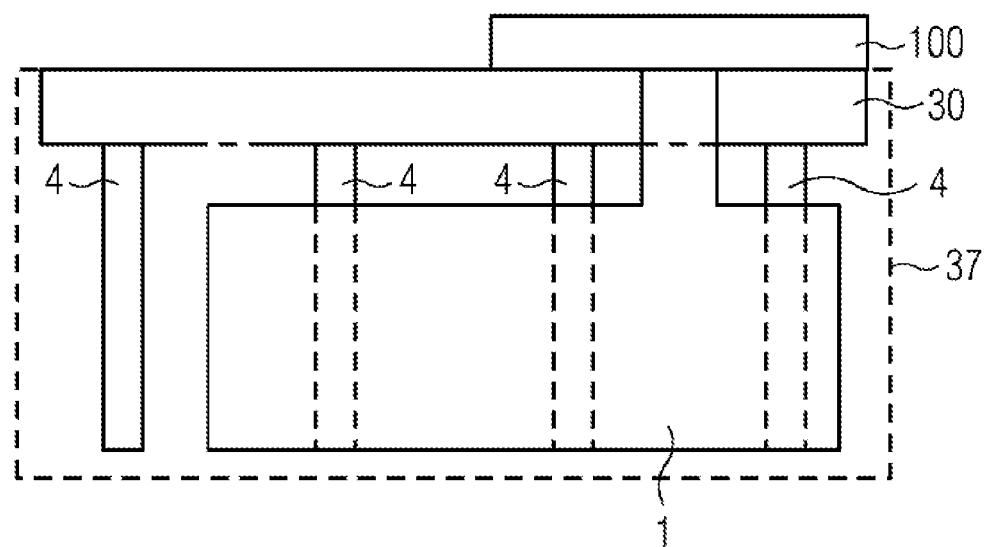
FIG. 14 shows a detailed view of the test bed of FIGS. 9 to 11, a very large specimen being mounted therein.

FIG. 14 shows a further exemplary embodiment of the double receptacle of FIGS. 9 to 11, in which a very large specimen 1 is mounted across both receptacles so as to be on three of the longitudinal supports 4. This permits even very large specimens 1 to be supported and to be adapted to the test bed 2.

Figure 15:
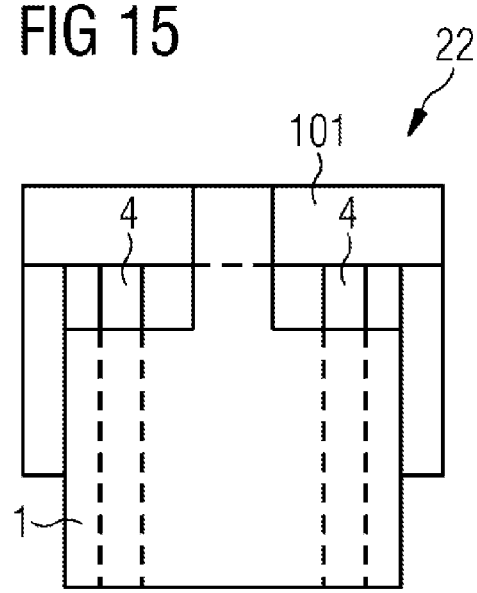
FIG. 15 shows a plan view of an adapter truck having adjustable supports.

FIG. 15 shows a plan view of an adapter truck 22 having two longitudinal supports 4 which by means of the mechanism shown in FIG. 5, or an equivalent mechanism, may be flexibly adjusted so as to adapt the adapter truck 22 to the individual dimensions of a specimen 1 which is mounted on the longitudinal supports 4. The adapter truck 22 furthermore includes a truck interface 101 by means of which the adapter truck 22 may be coupled to a test bed or to an adapter station.

FIG. 15 shows the potential for the receptacle to be installed on a separate adapter truck 22. It is meaningful herein for the truck interface 101, besides a mechanical interface, to be provided with an electrical interface which automatically contacts the mechanism.

Figure 18:
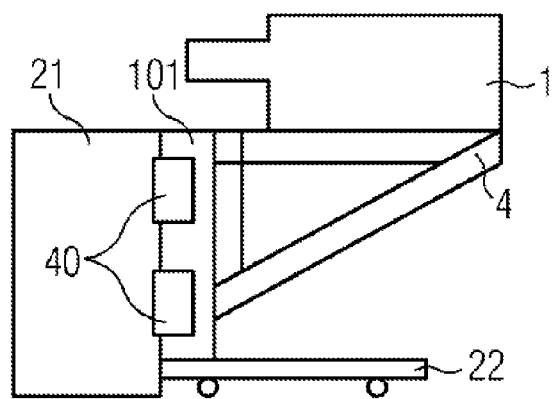
FIG. 18 shows an adapter truck which is docked to an adapter station.

The adapter truck 22 has to be supplied with electricity only when the specimen 1 is adapted at the adapter station 21 which is shown in FIG. 18, so that the positions of the longitudinal supports 4 may be adjusted. Since the positions are mechanically latched, the former are maintained even without an electrical supply. In as far as the actuators are disposed in the adapter truck 22, the adapter station 21 includes the remaining power electronics. Alternatively, the actuators per se may be received in the adapter station 21 such that the necessary motions are transmitted in a purely mechanical manner by way of docking-capable shafts to the four axes of the mechanism of the adapter truck 22. In this case, the adapter truck 22 is purely passive, and is correspondingly easier and more cost-effective to make.

The adapter truck 22 by way of the longitudinal supports 4 may also grip a simple mounting truck on which the specimen 1 is mounted.

Figure 16:
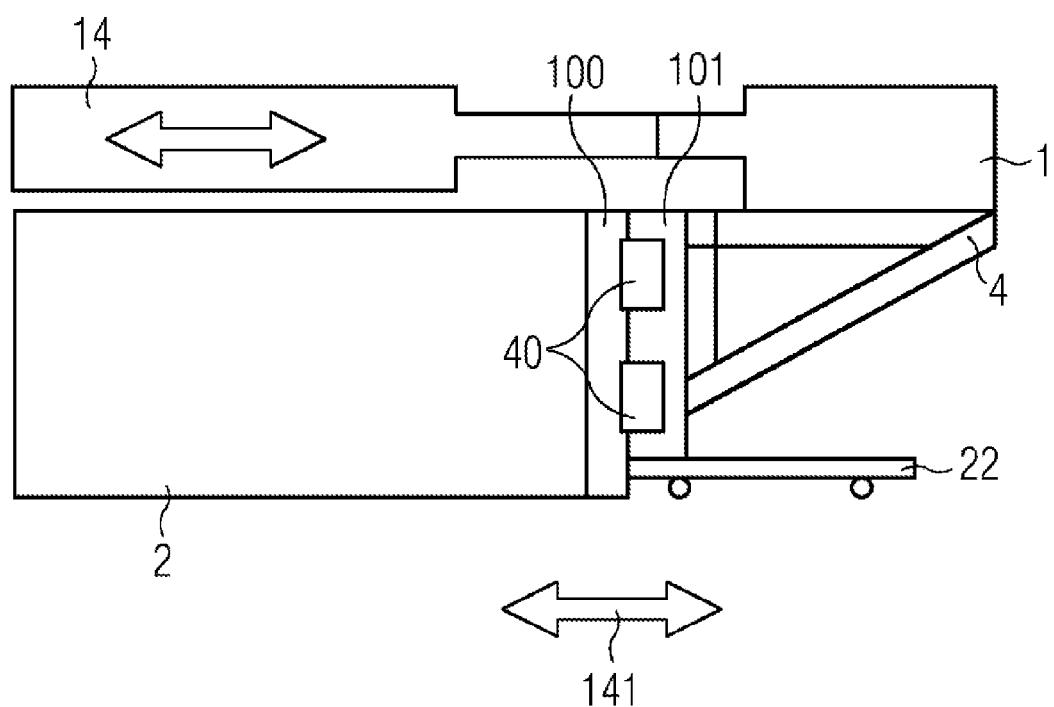
FIG. 16 shows the adapter truck of FIG. 15 docking to a test bed, in a side view.

FIG. 16 shows the adapter truck 22 of FIG. 15, once the latter has been docked to a test bed 2. Herein, a mechanical coupling which is to be rapidly closed and to be rapidly opened and which is capable of absorbing the testing forces on the test bed 2 is provided by means of one or a plurality of connections 40 between the truck interface 101 and a test-bed interface 100.

In a manner analogous to the preceding exemplary embodiments, the adapter truck 22 includes adapter axes which are shown as elements of the mechanism 3 in FIG. 5, for example. By means of these adapter axes the longitudinal supports 4 of the adapter truck 22 are suitable adjusted so as to align the specimen 1 in a highly accurate manner to the force generator 14 on the test bed 2.

Figure 17:
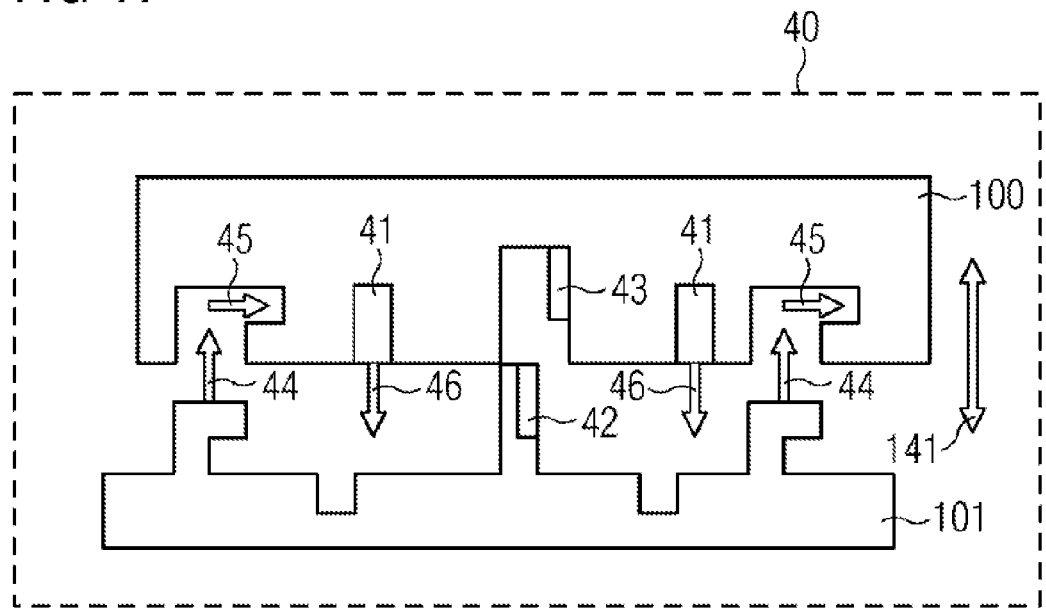
FIG. 17 shows a detailed view of a truck interface which is adapted for mechanical coupling to a test-bed interface.

FIG. 17 shows a detailed view (plan view) of a truck interface 101 which is adapted for producing a mechanical and electrical connection to a test-bed interface 100 of a test bed. To this end, the adapter truck is first moved along a first motion vector 44. Subsequently, the adapter truck is moved along a second motion vector 45, whereupon locking bolts 41 of the test-bed interface 100 are deployed along a third motion vector 45, mechanically locking the adapter truck in the test-bed interface 100.

This connection is very robust such that the former can absorb the testing forces 141. An electrical plug 42 is automatically and conjointly plugged into an electrical socket 43 of the test-bed interface 100 when the connection is produced. On account thereof, electrical contacting of the adapter truck and, indirectly, also of a specimen which is mounted on the adapter truck is provided.

The uniform socket-plug connection is automatically and conjointly plugged when the adapter truck docks to the test bed or to an adapter station. Alternatively for the electrical integration of the adapter truck, a separate adapter cable may be manually plugged in. In order for a specimen which is mounted on the adapter truck to be electrically contacted, said specimen may initially be plugged into the adapter truck by way of the specific specimen-side cable, which adapter truck in turn by way of the standardized socket-plug interface which is shown in FIG. 17 is automatically contacted at the test bed or at the adapter station.

The electrical connection between the test bed and the adapter truck may be utilized in order to be able to reposition the point machine during the testing sequence by means of the longitudinal supports 4.

Instead of the test-bed interface 100, an interface of the same type may be provided on an adapter station to which the adapter truck docks.

FIG. 18 in a side view shows such an adapter station 21 to which the adapter truck 22, having the truck interface 101 thereof, has docked. The adapter truck 22 at the adapter station 21 may be automatically or manually adjusted to the respective specimen 1. In the case of automatic adjustment, the adapter station 21 supplies electric power and control signals for the axes of the mechanism of the adapter truck 22, in order for the two longitudinal supports 4 to be adjusted. Herein, the adapter truck 22 by means of the longitudinal supports 4 may also grip a simple mounting truck on which the specimen 1 is mounted. The adapter truck 22 per se is mounted on wheels which are rotatable by 360°, for example, or on spherical rollers.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An assembly for testing point machines,
    having at least one receptacle device comprising:
        at least two supports which are adapted for receiving a point machine as a specimen, or for receiving a mounting truck on which a point machine as a specimen is mounted; and
        a mechanism which is adapted for displacing the supports both in the horizontal direction and in the vertical direction;
    having a test bed which disposes of a force generator which is adapted for applying counterforces to the specimen while the specimen on the test bed performs actuation procedures, on account of which the test bed is adapted for adjusting and/or testing forces which are generated by the specimen; and wherein the force generator and the mechanism in mechanical and electrical terms are mutually independent such that the supports are displaceable without being influenced by the test bed or by the force generator, on account of which a predefined coupled position between the specimen and the force generator is adjustable.

2. The assembly as claimed in claim 1, wherein the mechanism is adapted for adjusting a horizontal spacing between the supports.

3. The assembly as claimed in claim 1, wherein the mechanism is adapted for displacing the supports in a mutually independent manner, both in the horizontal direction and in the vertical direction.

4. The assembly as claimed in claim 1, wherein the mechanism for displacing the supports in the horizontal direction and the vertical direction has horizontal and vertical linear guides, which are linear friction bearings, dovetail guides, profiled rail guides, or caged rail guides.

5. The assembly as claimed in claim 1, wherein the mechanism for each of the supports is specified with one dedicated horizontal linear drive and with one dedicated vertical linear drive, said linear drives both being adapted for automated displacement of the respective support to a required position.

6. The assembly as claimed in claim 5, wherein the mechanism is configured from at least two vertically mounted cross tables and/or vertically mounted X-Y linear drives, one of the supports being mounted on each thereof.

7. The assembly as claimed in claim 5, wherein each support is mounted on a support slide which is displaceable by the respective vertical linear drive; wherein each vertical linear drive is mounted on a transverse slide which is displaceable by the respective horizontal linear drive.

8. The assembly as claimed in claim 5, wherein the linear drives interact with in each case parallel guides which are constructed for guiding the respective slides; and
    wherein the linear drives each include one hydraulic or electric linear motor or linear actuator.

9. The assembly as claimed in claim 5, having a controller in which support positions depending on types of specimens are programmed, whereby the controller is adapted for actuating the linear drives and for automated displacing of the supports to the support positions.

10. The assembly as claimed in claim 1, wherein the mechanism by way of the supports is conceived for gripping and/or lifting a mounting truck, the specimen being fastenable thereto by a screw connection; and wherein the supports have fastening elements, which are bolts, pins, gripping arms, depressions, or horizontal bores, which are disposed inboard and which permit the mounting truck to be gripped in particular by clamping the mounting truck between the supports.

11. The assembly as claimed in claim 1, wherein the supports have vertical threaded bores which permit fastening of the specimen by a screw connection.

12. The assembly as claimed in claim 1, wherein the supports have outboard fastening means, which are dovetail profiles, which are screwed into horizontal threaded bores and which are adapted for fastening additional fastening elements, in particular clamps, for the specimen.

13. The assembly as claimed in claim 1, wherein the receptacle device is mounted on the test bed per se, or on the floor beside the test bed.

14. The assembly as claimed in claim 1, wherein the test bed has a test-bed interface which has at least one horizontal guide; having a slide which is displaceable along the horizontal guide; and having at least two of the receptacle devices which are mounted beside one another on the slide.

15. The assembly as claimed in claim 14,
having a running gear which is composed of rollers, wheels, or a guide, which supports the slide on a ground.

16. The assembly as claimed in claim 14,
having at least one protective wall which is mounted between the receptacle devices on the slide;
or
having a protective hood which is mounted on the test bed.

17. The assembly as claimed in claim 1,
having an adapter truck which has a frame on which the receptacle device is mounted; and wherein the frame has a truck interface by way of which the adapter truck is capable of being mechanically coupled to a test-bed interface of the test bed.

18. The assembly as claimed in claim 17,
having an adapter station which is adapted for mechanically coupling the truck interface of the adapter truck to the adapter station; and
by the mechanism for displacing the supports both in the horizontal direction and in the vertical direction.

19. The assembly as claimed in claim 18, wherein the mechanism for each of the supports has a drive shaft for a self-locking actuator gear for displacing the respective support in a direction X; and wherein the mechanism for each of the supports has a drive shaft for a self-locking actuator gear for displacing the respective support in a direction Y which is orthogonal to the direction X.

20. The assembly as claimed in claim 19, wherein the drive shafts each have a mechanical connector for transmitting torque, by way of which the drive shafts, when mechanically coupling the adapter truck to the adapter station, are capable of being automatically docked to actuators in the adapter station.

21. The assembly as claimed in claim 17, wherein the truck interface has an electric plug connector which when mechanically coupling the adapter truck to the test bed or to the adapter station is automatically plugged into an electrical plug connector of the test-bed interface or of the adapter station.

22. The assembly as claimed in claim 19, wherein the adapter truck has an actuator for each drive shaft; and wherein the adapter station by way of the electrical plug connectors provides electric power and control signals to the actuators, in order for the supports to be displaced.

23. The assembly as claimed in claim 1, having a mounting truck which is adapted for receiving the point machine and which is capable of being fixed by a form-fit between the supports.

24. A method for testing a point machine,
displacing by way of a mechanism at least two supports both in the horizontal direction and in the vertical direction; and
mounting a point machine as a specimen on the supports; or
gripping and/or lifting with the mechanism by way of the supports, a mounting truck to which a point machine as the specimen is fastened;
applying with a test bed counterforces to the specimen by way of a force generator while the specimen on the test bed performs actuation procedures, wherein forces which are generated by the specimen are adjusted and/or tested; and displacing the supports prior to mounting of the specimen without being influenced by the test bed or by the force generator, on account of which a predefined coupled position between the specimen and the force generator is adjusted.

25. The method as claimed in claim 24, wherein the supports in a mutually independent manner are displaced both in the horizontal direction and in the vertical direction.

26. The method as claimed in claim 24,
wherein a controller, in which support positions depending on types of specimens are programmed, actuates linear drives, and in an automated manner displaces the supports to one of the support positions.

27. The method as claimed in claim 24,
wherein an adapter truck having a truck interface is docked to an adapter station, whereby
a plug connector of the truck interface is automatically plugged into a plug connector of the adapter station, on account of which actuators of the adapter truck are supplied with electricity; or, for transmitting torque, actuators of the adapter station are docked to mechanical connectors of the truck interface;
wherein the adapter truck is adapted to a specimen or a mounting truck in that the supports of the adapter truck, by means of the actuators of the adapter truck, or the actuators of the adapter station, are displaced to positions which are suitable for receiving the specimen or the mounting truck;
wherein the specimen is mounted on the adapter truck, or the mounting truck is clamped in a form-fitting manner between the supports; and
wherein the adapter truck by way of the truck interface thereof is docked to a test bed.

28. The use of the assembly as claimed in claim 1, for adjusting the predefined coupled position between the specimen and the force generator on the test bed.

29. The use of the receptacle device of the assembly as claimed in claim 1, for gripping and/or lifting a mounting truck on which the specimen is mounted.

30. The use of the assembly as claimed in claim 1 for adjusting and/or testing forces which are generated by a point machine as a specimen.

* * * * *